United States Patent
Patterson et al.

(10) Patent No.: US 10,374,877 B2
(45) Date of Patent: Aug. 6, 2019

(54) ADDRESS EXTRACTION OF A CLUSTER CONFIGURATION INCEPTION POINT

(71) Applicant: NetApp, Inc., Sunnyvale, CA (US)

(72) Inventors: John Allen Patterson, Niwot, CO (US); Adam John Carter, Louisville, CO (US); Derek John Leslie, Erie, CO (US)

(73) Assignee: NetApp., Inc., Sunnyvale, CA (US)

( * ) Notice: Subject to any disclaimer, the term of this patent is extended or adjusted under 35 U.S.C. 154(b) by 81 days.

(21) Appl. No.: 15/589,972

(22) Filed: May 8, 2017

(65) Prior Publication Data
US 2018/0324040 A1 Nov. 8, 2018

(51) Int. Cl.
| | |
|---|---|
| *H04L 29/06* | (2006.01) |
| *H04L 12/24* | (2006.01) |
| *H04W 8/00* | (2009.01) |
| *H04W 76/10* | (2018.01) |
| *H04W 8/26* | (2009.01) |
| *H04L 12/70* | (2013.01) |
| *H04L 29/12* | (2006.01) |

(52) U.S. Cl.
CPC ......... *H04L 41/0806* (2013.01); *H04L 41/12* (2013.01); *H04W 8/005* (2013.01); *H04W 76/10* (2018.02); *H04L 61/2015* (2013.01); *H04L 2012/5685* (2013.01); *H04W 8/265* (2013.01)

(58) Field of Classification Search
CPC .................................................. H04L 41/0806
See application file for complete search history.

(56) References Cited

U.S. PATENT DOCUMENTS

| | | | |
|---|---|---|---|
| 2011/0213869 A1* | 9/2011 | Korsunsky | G06F 21/55 709/223 |
| 2016/0037196 A1* | 2/2016 | Peters | H04N 7/17318 725/31 |

* cited by examiner

*Primary Examiner* — Adnan M Mirza
(74) *Attorney, Agent, or Firm* — Cesari and McKenna, LLP

(57) ABSTRACT

An initial node deployment to form a cluster involves execution of program code to begin discovering other nodes on a LAN that will constitute the cluster. A node initially starts processes to obtain information to transition from an unconfigured state to a configured state. The nodes on the LAN can execute a discovery process that facilitates forming and configuring of the cluster, but the discovered information is confined within the LAN. This effectively blocks cluster configuration until someone locally connects to a host and retrieves a node address. To remove this obstacle, a node image can include program code to detect a compliant target device and extract to the target device an address of a discovered node that is valid for remote cluster configuration. The target device can then be used to convey the extracted address to allow commencement of cluster configuration remotely.

19 Claims, 5 Drawing Sheets

ADDRESS EXTRACTION OF A CLUSTER CONFIGURATION INCEPTION POINT

BACKGROUND

The disclosure generally relates to the field of data processing, and more particularly to generic control systems or specific applications.

For configuration of a new cluster, an administrator can access each node of the new cluster with their network addresses. However, the administrator lacks visibility into configuration information of the nodes at start up. The administrator has no knowledge as to which nodes have started and obtained network addresses from a dynamic host configuration protocol (DHCP) server(s). To obtain this information, personnel physically access each node host. For instance, a person rolls a cart to each host and connects a keyboard and monitor to obtain the address of the node. This process of initially obtaining the network addresses of the nodes is time consuming and can be arduous due to navigating hundreds of hosts and bundles of cabling.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to writing an extracted node address to a universal serial bus (USB) flash drive as a target device in illustrative examples. Aspects of this disclosure can also write an extracted node address to other types of devices with machine-readable media that can be connected to a host interface. In other instances, well-known instruction instances, protocols, structures and techniques have not been shown in detail in order not to obfuscate the description.

Terminology

This description uses the terms "host" and "node." A "node" refers to a collection of processes that coordinate and/or communicate to carry out one or more tasks. For instance, a "storage node" refers to the processes for handling client requests, writing data to storage devices, accessing data on storage devices, and maintaining metadata for data object. Thus, program code for a storage node can include a front-end for handling client requests, a back-end for transactions with storage devices, and management program code for coordinating with other storage nodes in a distributed storage system. A "compute node" refers to a set of one or more processes that carry out one or more tasks substantially involving processing of data and not limited to storing and accessing data, although processing includes writing and accessing data. For instance, a compute node may perform a map/reduce function, data transformation (e.g., encryption), etc. A "host" refers to an apparatus or hardware that can host one or more nodes.

Overview

An initial node deployment to form a cluster involves execution of program code (e.g., a system image or node image) to begin discovering other nodes on a local area network (LAN) that will constitute the cluster. Whether a system image is installed on a host on site or pre-installed, a node initially starts processes to obtain information to transition from an unconfigured state to a configured state. The nodes on the LAN can execute a discovery process that facilitates forming and configuring of the cluster, but the discovered information is confined within the LAN. This effectively blocks cluster configuration until someone locally connects to a host and retrieves a node address. To remove this obstacle, a node image can include program code to detect a compliant target device and extract to the target device an address of a discovered node that is valid for remote cluster configuration. The target device can then be used to convey the extracted address to allow commencement of cluster configuration remotely.

Example Illustrations

Figure 1:
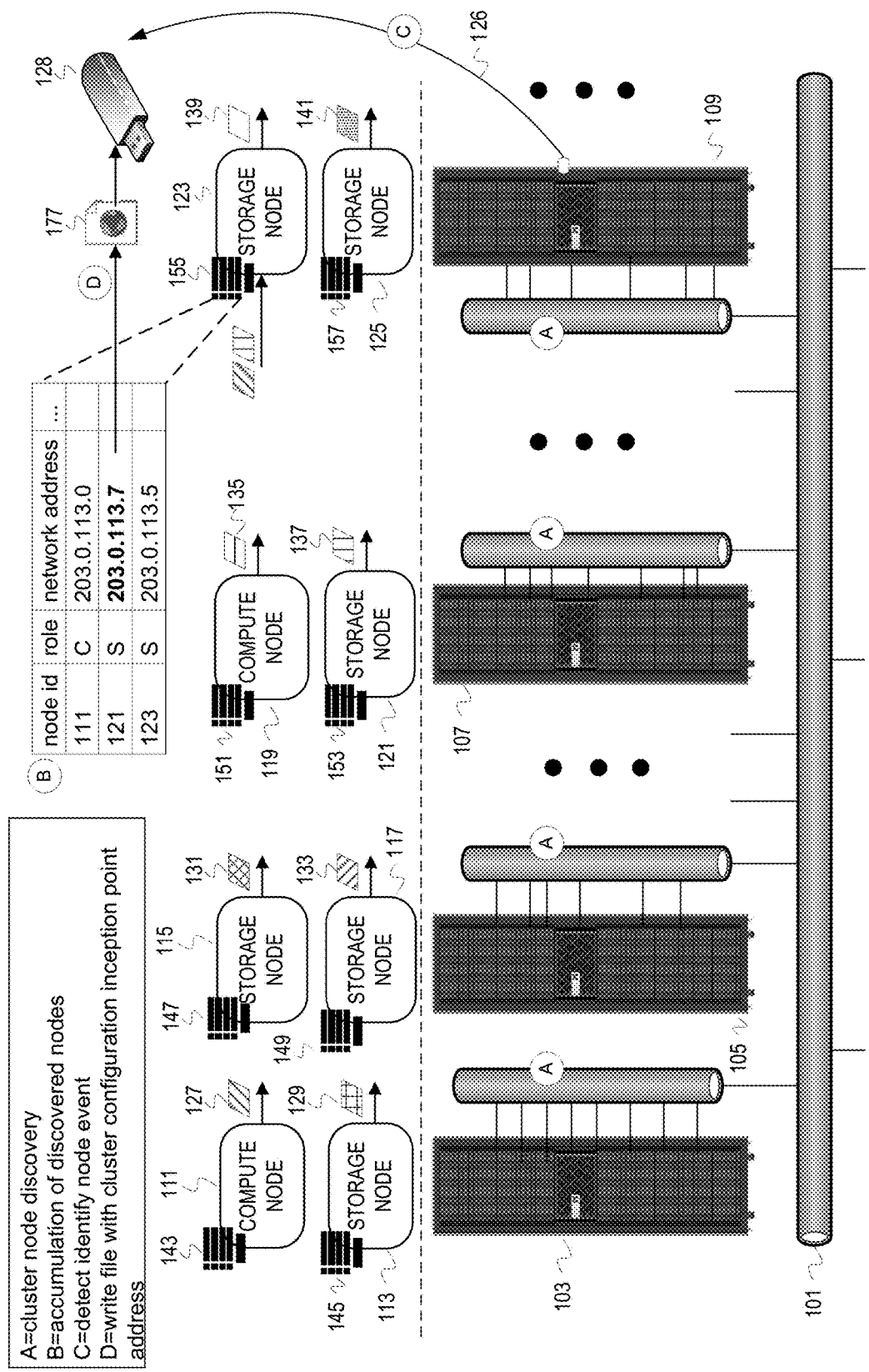
FIG. 1 depicts a part of an example data center with racks of hosts and depicts extraction of an inception point address for cluster configuration from one of the hosts.

FIG. 1 depicts a part of an example data center with racks of hosts and depicts extraction of an inception point address for cluster configuration from one of the hosts. A set of racks includes a rack 103, a rack 105, a rack 107, and a rack 109. The set of racks includes hosts and storage devices. The constituents of the racks communicate over a LAN 101, which includes various network elements not depicted (e.g., switches, routers, gateways, etc.). The rack 103 houses hosts with a compute node 111 and a storage node 113 installed. The rack 105 houses hosts with a storage nodes 115, 117 installed. The rack 107 houses hosts with a compute node 119 and a storage node 121 installed. The rack 109 houses hosts with a storage nodes 123, 125 installed.

Forming a cluster and cluster configuration inception point address extraction with the nodes generally involves four stages in this illustration—A) cluster node discovery, B) accumulation of discovered nodes, C) detection of an identify node event, and D) writing a file to a target machine-readable medium ("target") with the cluster configuration inception point address. FIG. 1 includes labels to depict the four stages. When initially starting up the nodes, the nodes will be unconfigured and perform a discovery process. The nodes will obtain configuration information and communicate at least some of the configuration information to the other nodes that constitute the cluster. In FIG. 1, each of the nodes communicates a packet(s) (e.g., user datagram protocol (UDP) packet) with the self-describing configuration information: each of the compute nodes 111, 119 respectively communicates self-describing packets 127, 135; each of the storage nodes 113, 115, 117, 121, 123, 125 respectively communicates self-describing packets 129, 131, 133, 137, 139, 141.

In stage B, the nodes will be listening for self-describing packets and accumulating those that are received. Each of the nodes can instantiate a data structure in memory or storage to record the configuration information from other nodes. Each of the compute nodes 111, 119 respectively accumulates this information in data structures 143, 151. Each of the storage nodes 113, 115, 117, 121, 123, 125 respectively accumulates this information into data structures 145, 147, 149, 153, 155, 157. Each of the data structures may be an instance of a distributed store/database, eventually be persisted to a distributed store/database, be communicated to an administrative domain after cluster configuration inception point address extraction, etc. At one point during discovery, the storage node 123 has accumulated information from the self-describing packets 127, 137 into the data structure 155. The storage node 123 has also written its own self-describing information into the structure 155. The accumulate configuration information in this example includes node identifiers, a role indicator (compute or storage), and network address. The configuration information can include other information, such as host identifier, version number, etc.

At stage C, the storage node 123 detects an identify cluster configuration inception point node event. The storage node detects that a target 128 has been connected to the host of the storage node 123. Based on detection of this event, the storage node 123 selects a valid node from the structure 155 to extract to the target as the configuration inception point node at stage D. For this illustration, the storage node 123 selects the network address of the storage node 121. The storage node 123 creates a hypertext markup language (HTML) file 177 that indicates the network address of the storage node 121, and writes the file 177 to the target 128. The target 128 can then be sent to an administrator to allow cluster configuration or connected to another device for sending the file 177 to allow for cluster configuration.

Figure 2:
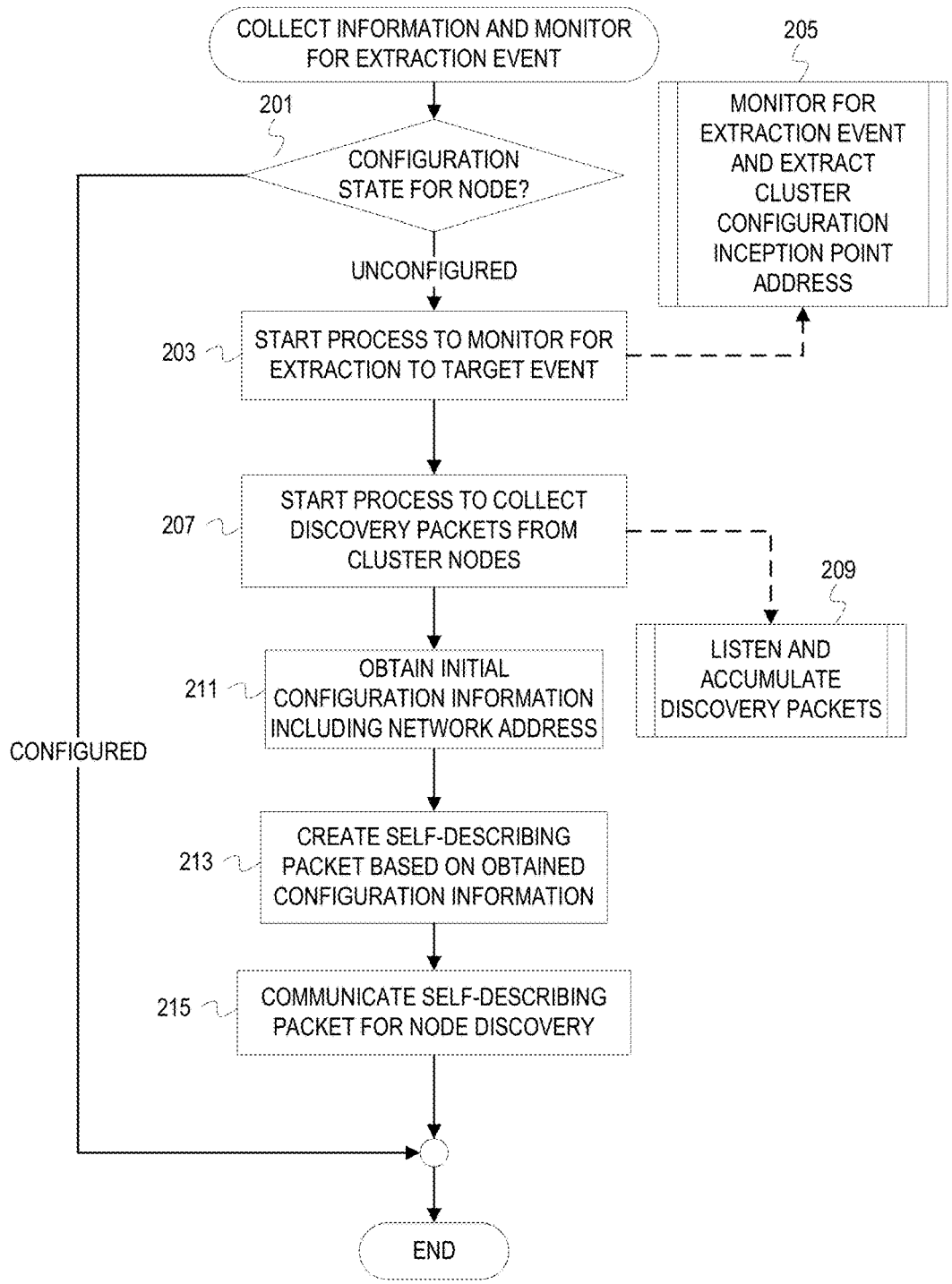
FIG. 2 depicts a flowchart of example operations for collecting node configuration information and monitoring for an extraction event.

FIG. 2 depicts a flowchart of example operations for collecting node configuration information and monitoring for an extraction event. FIG. 2 refers to a node performing the example operations. Program code corresponding to the example operations of FIG. 2 is executed at start up and involves the launch of multiple processes/threads to collect information that allows for identifying a valid configuration inception point node and extracting its address.

At block 201, the node determines its configuration state. The node can check a flag or state indicator that expressly indicates whether the node is in an unconfigured or configured state. The node may implicitly determine configuration state by determining presence of configuration information. If the node has already been configured, then the execution path ends. Otherwise, execution continues to block 203.

Figure 4:
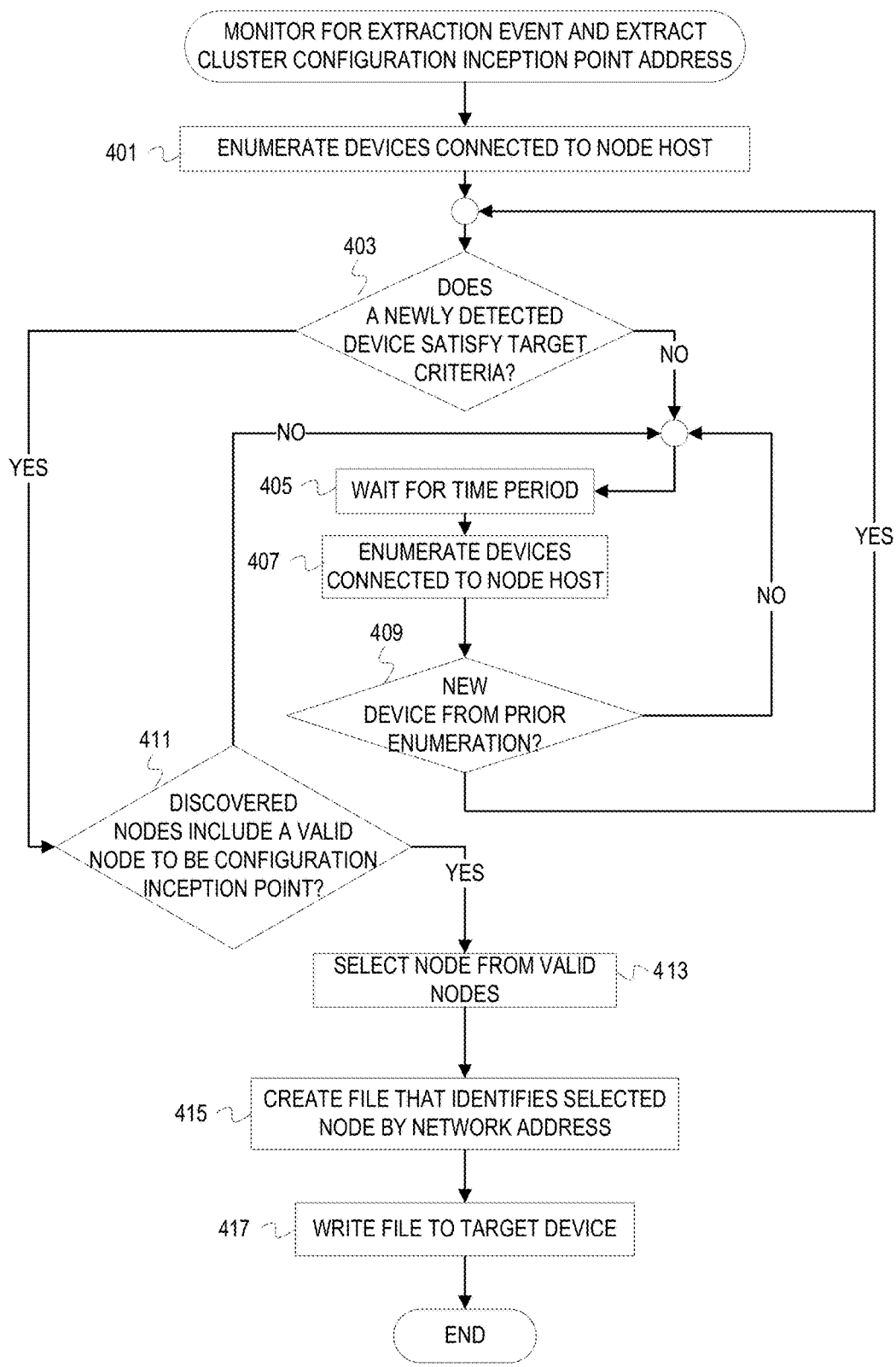
FIG. 4 depicts a flowchart of example operations for monitoring for an extraction event and extracting a cluster configuration inception point address based on detection of the extraction event.

At block 203, the node starts a process to monitor for an extraction to target event. The node can start a background process or thread that monitors host interfaces for the extraction to target event. Block 205 represents the background process monitoring for the extraction event and extracting a cluster configuration inception point address based on detection of the extraction event. Example operations for this process are depicted in FIG. 4.

Figure 3:
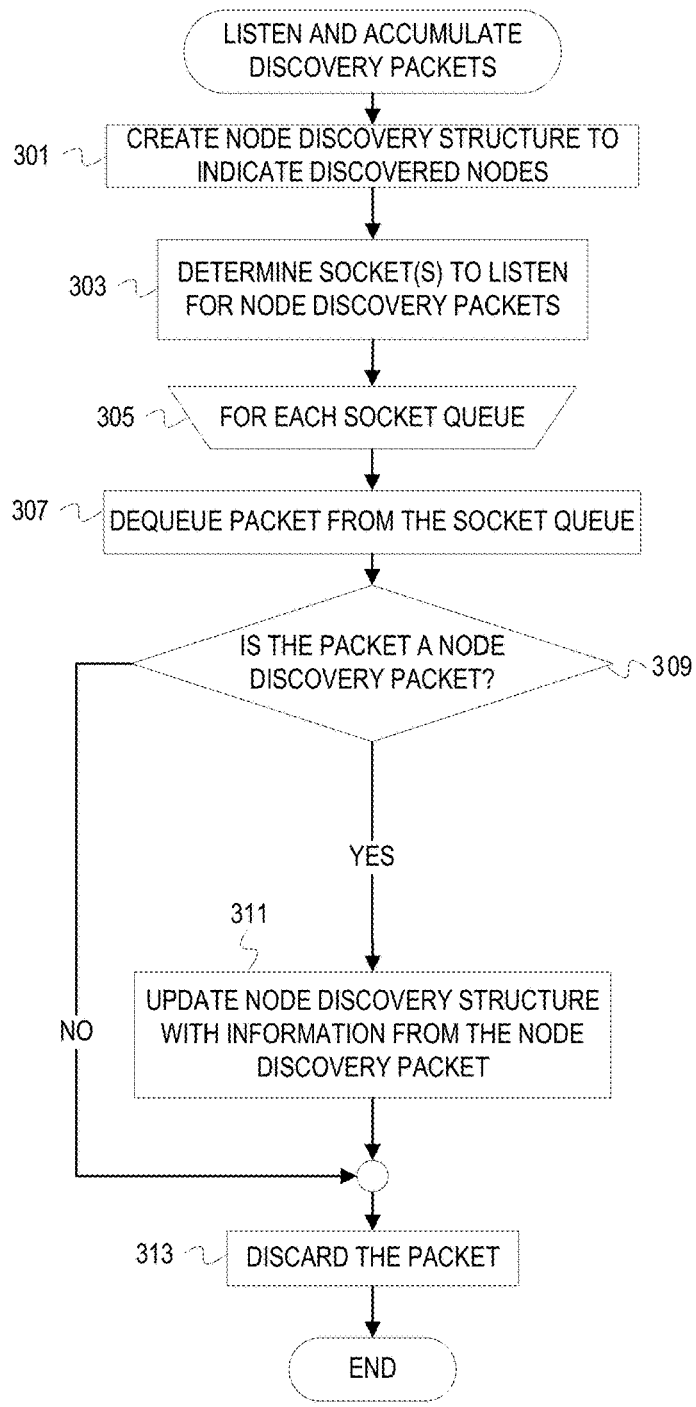
FIG. 3 is a flowchart of example operations for listening and accumulating discovery packets.

At block 207, the node starts a process that listens for and accumulates discovery packets. Block 209 represents the listening process listening for discovery packets and accumulating information from received discovery packets. Example operations for this process are depicted in FIG. 3.

At block 211, the node obtains initial configuration information including a network address for the node. The node can read a configuration file to obtain some configuration information and interact with operating system (OS) services for other configuration information. For instance, the node can read a configuration file to determine a node identifier and role for the node. As another example, the node queries a network service or DHCP server to determine a network address assigned to the node. If a separate process obtains the network address, the node can read a predefined location for the assigned network address or invoke an OS call to determine the assigned network address.

At block 213, the node creates a self-describing discovery packet based on the obtained configuration information. The node constructs a packet with predefined fields and populates the packet with the obtained information. A configuration file or class definition can specify the structure and content of a self-describing discovery packet. Depending upon implementation, the node can construct a series of self-describing discovery packets as configuration information is incrementally obtained. For example, the node may create an initial discovery packet with configuration information from a configuration file and then create subsequent discovery packets as additional configuration information is obtained.

At block 215, the node communicates the self-describing discovery packet for node discovery. The node can broadcast or multicast the self-describing discovery packet.

FIG. 3 is a flowchart of example operations for listening and accumulating discovery packets. The example operations of FIG. 3 are performed by the process/thread started by a node as represented by block 207. As with FIG. 2, FIG. 3 refers to the node as performing the example operations.

At block 301, the node creates a node discovery structure to indicate discovered nodes. The data structure can be an in-memory structure that is updated as new nodes are discovered for cluster formation.

At block 303, the node determines which sockets to listen for node discovery packets. The node can listen to an individual socket, a set of non-contiguous sockets, or a range of sockets (range as defined by a range of network addresses and a set of port numbers).

At block 305, the node begins processing discovery packets received at a queue of each determined socket. The node can iterate over the socket queues or be interrupt/event driven. A socket queue being processed is referred to as a selected socket queue.

At block 307, the node dequeues a packet from the selected socket queue. The node can read the packet into memory and update a pointer of the selected socket queue and/or clear the socket queue entry.

At block 309, the node determines whether the packet is a node discovery packet. The socket queue may receive other types of packets. The node discards the packet at block 313 if not a discovery packet, although the node can also disregard the packet for consumption by a different process. If the packet is a node discovery packet, then the node updates the node discovery structure with information from the node discovery packet. The node can copy the information discovery packet into the node discovery structure or copy select fields from the discovery packet. The node can then discard the discovery packet at block 313 or pass the discovery packet for further processing by another process.

FIG. 4 depicts a flowchart of example operations for monitoring for an extraction event and extracting a cluster configuration inception point address based on detection of the extraction event. The example operations of FIG. 4 correspond to block 205 of FIG. 2.

At block 401, the node enumerates devices connected to the node's host. The node can invoke an enumerate function (e.g., an OS call) that returns a list of devices connected to the host. The node may determine a list of connected devices for each of multiple types of physical interfaces or for a subset of specified interfaces. For example, the node may limit monitoring to automated interfaces (e.g., USB interface, IEEE 1394 interface, peripheral component interconnect (PCI) express interface, etc.). As another example, the node may limit monitoring to all interfaces that are not power and network interfaces).

At block 403, the node determines whether there is a newly detected device that satisfies a set of one or more target criteria. On a first run, all the devices in the list will be newly detected. The node evaluates information about each of the newly detected devices against the set of target criteria. The set of criteria can be defined to address security concerns, implement corporate policy, etc. Examples of criteria include requiring an empty media, a specified formatting, threshold capacity, operational capability (e.g., security capability and/or plug and play capability), etc. In some cases, the interface type can be incorporated into the target criteria. In other words, the node can obtain a list of all connected devices and then filter out those that do not satisfy a criterion specifying one or more acceptable interfaces. If a new device is not detected that satisfies the target criteria, then execution proceeds to block 405. If a new device is detected that satisfies the target criteria, then execution proceeds to block 411.

At block 405, the node waits for a defined time period. The time period can be a static time period of a dynamic time period that contracts or expands depending upon one or more variables, such as time since start, time since detection of a newly connected device, etc.

At block 407, the node again enumerates devices connected to the node's host. In some implementations, the node doesn't wait for a time period and proceeds to enumerating connected devices after evaluating detected devices.

At block 409, the node determines whether a new device has been connected to the host since the prior enumeration and whether it satisfies the target criteria. The node compares the listings of devices to determine a difference. For efficiency of comparison, the node can generate hash values for each combination of device identifier and interface identifier and compare the hash values to detect a newly connected device. If a newly connected device is detected, then execution proceeds to block 403. The node evaluates the newly connected device(s) against the target criteria at block 403. The node may also evaluate the interface of the newly connected device against the target criteria. The node can evaluate all the newly connected devices or discontinue the evaluation upon encountering a compliant device. The detection of a newly connected compliant device is the extraction event. If an extraction event is not detected, then execution continues to block 405.

Upon detection of the extraction event, the node determines whether the discovered nodes include a valid node to be the cluster configuration inception point node at block 411. Validity can be based on its own set of one or more criteria. For instance, a valid node may be a node with a "storage" designation for role. In some cases, a combination of node attributes may be required for a valid node (e.g., version and role). The node evaluates the discovered configuration information of the discovered nodes, including itself, to determine validity. If none of the discovered nodes are valid, then execution returns to block 405. If at least one of the nodes is valid, then execution proceeds to block 413.

At block 413, the node selects a valid node from the nodes determined to be valid. In some cases, only one node will be determined to be valid or the node discontinues validity evaluation upon first encounter of a valid node. If the node has determined multiple nodes to be valid, then the node can select with a bias toward itself (assuming the node is a valid node) or another attribute, such as age of discovered configuration information. A selection rule may give preference to the node that has been running the longest, as an example.

At block 415, the node creates a file that identifies the selected node by network address. For example, the node creates an HTML file that includes an Internet Protocol (IP) address of the selected node read from the accumulated, discovered configuration information.

At block 417, the node writes the created file to the target device. In some implementations, the node may create the file on the target device instead of transferring or copying it from memory of the host to the target device. The node can have a locally defined file template that it populates with the cluster configuration inception point address.

Variations

The above example illustrations describe extraction as writing a file with the cluster configuration inception point address to a target device. Embodiments, however, are not limited to this method of extraction. The method of extraction can vary by type of target device. For instance, the target device may be an external wireless adapter or wireless connectivity dongle. For this case, a node can configure the target device to wirelessly convey the cluster configuration inception point address as a network identifier, such as configuring a network name or service set identifier (SSID) on the target device for wireless publishing.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 203 and 207 can be performed in inverse order or in parallel. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
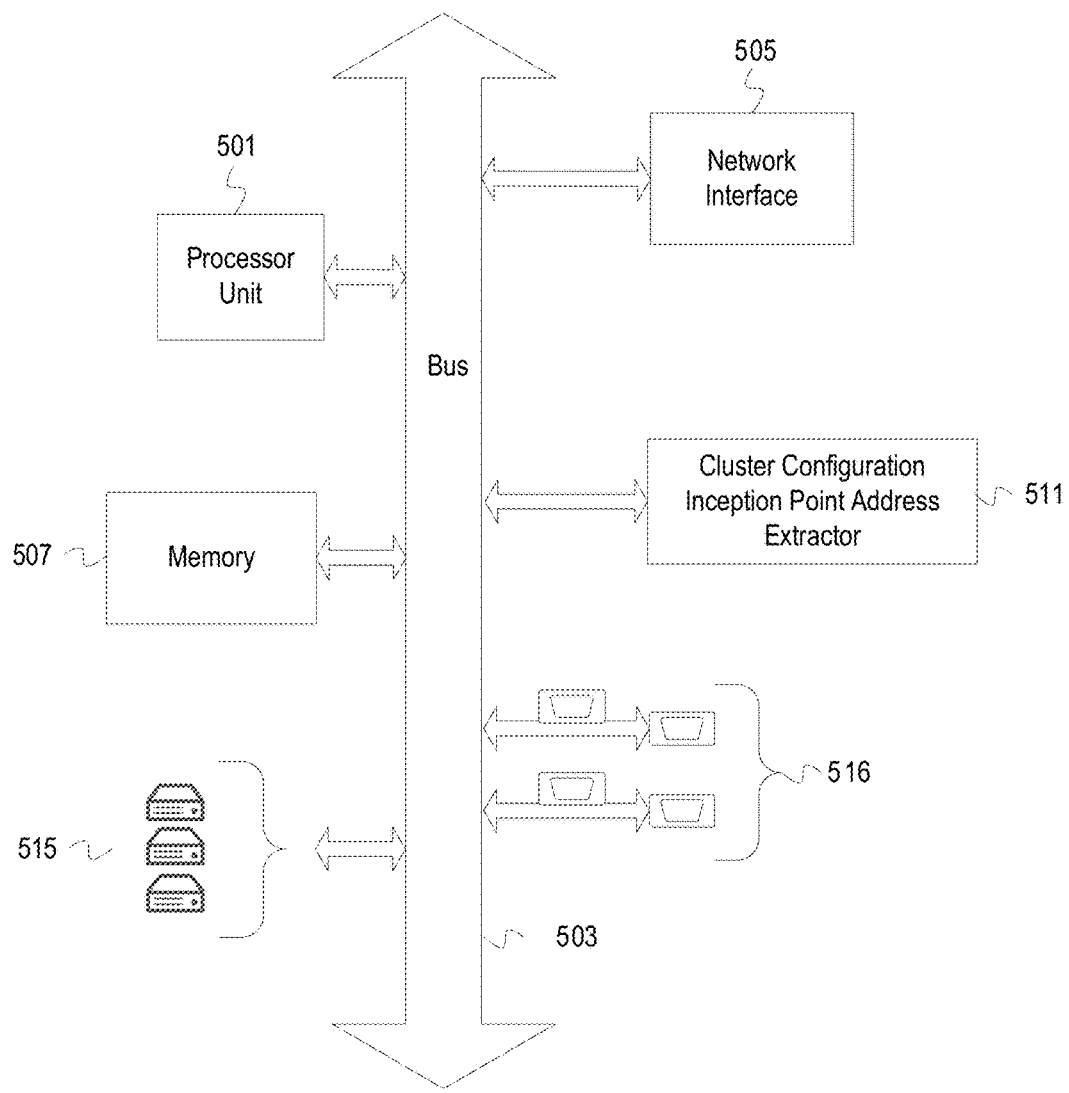
FIG. 5 depicts an example computer system with a cluster configuration inception point address extractor.

FIG. 5 depicts an example computer system with a cluster configuration inception point address extractor. The computer system or host includes a processor 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a set of interconnects 503 and interfaces 516 compliant with one or more protocols (e.g., PCI, ISA, PCI-Express, HyperTransport® bus, InfiniBand® bus, NuBus, etc.). The computer system also includes a network interface 505 (e.g., a Fiber Channel interface, an Ethernet interface, an internet small computer system interface, SONET interface, wireless interface, etc.). The system also includes a cluster configuration inception point address extractor 511. The cluster configuration inception point address extractor 511 determines a network address of a node that is valid to be an inception point for cluster configuration and writes the determined network address to a target device connected to one of the set of interfaces 516. The cluster configuration inception point address extractor 511 monitors the host for an extraction event, which is when a device connected to one of the interfaces 516 is detected and determined as satisfying a set of one or more criteria for being a target device. The cluster configuration inception point address extractor 511 then determines whether one of the discovered nodes qualifies to be a node for beginning remote cluster configuration. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501 and the network interface 505 are coupled to the bus 503. Although illustrated as being coupled to the bus 503, the memory 507 may be coupled to the processor unit 501. The system also includes a set of storage devices 515 which can include solid state storage devices, disk storage devices, a mixture of different types of storage devices, etc. The storage devices 515 may be connected to the system via interfaces that are not network interfaces and can be connected via the network interface 505.

While the aspects of the disclosure are described with reference to various implementations and exploitations, it will be understood that these aspects are illustrative and that the scope of the claims is not limited to them. In general, techniques for extracting a network address of a node for cluster configuration as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
sending, via a network, a discovery packet having configuration information for a first node of a cluster, the configuration information including a first network address associated with the first node;
accumulating, at the first node, one or more other discovery packets received from other nodes of the cluster, the other discovery packets including other network addresses associated with the other nodes of the cluster;

monitoring a set of one or more physical interfaces of the first node for a connected device compliant with a criterion;

in response to detection of the connected compliant device, determining which of the other nodes and the first node are valid nodes for cluster configuration and selecting one of the valid nodes having a second network address from the accumulated discovery packets, to act as a cluster configuration inception point; and writing the second network address to the connected compliant device.

2. The method of claim 1 further comprising creating a file including the second network address and accumulated configuration information of the selected valid node, wherein the file is formatted in a hypertext markup language.

3. The method of claim 1, wherein the connected compliant device is a wireless adaptor.

4. The method of claim 1 further comprising evaluating capability information of the connected device against the criterion.

5. The method of claim 1, wherein the selected one of the valid nodes is the first node.

6. The method of claim 1, wherein monitoring the set of one or more physical interfaces comprises repeatedly determining currently connected devices and comparing the currently connected devices against previously connected devices to determine newly connected devices.

7. The method of claim 1 further comprising determining that the first node is in an unconfigured state and performing node discovery to determine the configuration information for the first node and obtaining the network addresses of the other nodes.

8. The method of claim 1, wherein selecting one of the valid nodes from the accumulated discovery packets further comprises determining which of the valid nodes is configured as a storage node.

9. A non-transitory machine-readable media comprising program code for extracting an inception point address for a cluster configuration, the program code comprising executable instructions to:

generate self-describing information for a first node, wherein the self-describing information includes a first network address;

accumulate, at the first node, discovery packets received from other nodes of the cluster via a network, the discovery packets including other network addresses associated with the other nodes of the cluster;

monitor a set of physical interfaces at the first node for a connected device compliant with a criterion;

in response to detection of the compliant connected device, determine which of the other nodes and the first node are valid nodes for cluster configuration and select one of the valid nodes having a second network address from the accumulated discovery packets; to act as a cluster configuration inception point; and write the second network address to the compliant connected device as the inception point address for the cluster.

10. The non-transitory machine-readable media of claim 9, wherein the program code further comprises executable instructions to create a file including the second network address and accumulated configuration information of the selected valid node, wherein the file is formatted in a hypertext markup language.

11. The non-transitory machine-readable media of claim 9, wherein the selected one of the valid nodes is the first node.

12. The non-transitory machine-readable media of claim 9, wherein the program code further comprises executable instructions to evaluate capability information of the connected device against the criterion to determine compliance.

13. The non-transitory machine-readable media of claim 9, wherein the compliant device is a wireless adaptor.

14. The non-transitory machine-readable media of claim 9, wherein the instructions to monitor the set of physical interfaces comprise instructions to, repeatedly determine currently connected devices; and compare the currently connected devices against previously connected devices to determine newly connected devices.

15. The non-transitory machine-readable media of claim 9, wherein the program code further comprises executable instructions to determine whether the first node is in an unconfigured state, wherein the instructions to generate the self-describing information and to receive discovery packets are executed based on a determination that the first node is in the unconfigured state.

16. The non-transitory machine-readable media of claim 9, wherein the instructions to select one of the valid nodes from the accumulated discovery packets further comprises instructions to determine which of the valid nodes is configured as a storage node.

17. An apparatus comprising:

a processor coupled to physical interfaces and a network interface; and a machine-readable medium having program code executable by the processor to cause the apparatus to, generate self-describing information for a first node of a cluster, wherein the self-describing information includes a first network address;

accumulate, at the first node, discovery packets received from other nodes of the cluster via the network interface, the discovery packets including other network addresses associated with the other nodes of the cluster;

monitor the physical interfaces for connection of a wireless adaptor;

in response to detection of the connected wireless adaptor, determine which of the other nodes and the first node are valid nodes for cluster configuration and select one of the valid nodes having a second network address from the accumulated discovery packets, to act as a cluster configuration inception point; and configure a network name of the wireless adaptor to include the second network address so as to broadcast the cluster configuration inception point.

18. The apparatus of claim 17, wherein the program code executable by the processor to cause the apparatus to monitor the physical interfaces for the connection of the wireless adaptor is further configured to wait for a time period since detection of a newly connected device.

19. The apparatus of claim 17, wherein the machine-readable medium further comprises program code executable by the processor to cause the apparatus to determine whether the first node is in an unconfigured state, wherein the program code to generate the self-describing information and to receive discovery packets is executed based on a determination that the first node is in the unconfigured state.

* * * * *